United States Patent

[11] 3,582,783

[72] Inventor Melvin C. Hendrickson
Elmhurst, Ill.
[21] Appl. No. 785,181
[22] Filed Dec. 19, 1968
[45] Patented June 1, 1971
[73] Assignee Zenith Radio Corporation
Chicago, Ill.

[54] MULTIPLE-FUNCTION REMOTE CONTROL SYSTEM
1 Claim, 7 Drawing Figs.

[52] U.S. Cl. .......... 325/37, 340/167
[51] Int. Cl. .......... H04q 9/00
[50] Field of Search .......... 340/167, 164; 325/37; 179/15 A; 343/225; 328/137; 178/50

[56] References Cited
UNITED STATES PATENTS

| | | | |
|---|---|---|---|
| 3,257,644 | 6/1966 | Moore | 340/167 |
| 3,403,381 | 9/1968 | Haner | 340/167 |
| 3,482,046 | 12/1969 | Hughson et al. | 325/37 |

*Primary Examiner*—Richard Murray
*Assistant Examiner*—Peter M. Pecori
*Attorney*—John J. Pederson ABSTRACT: A multiple-function remote control system using digital logic for selectively actuating any desired one of a plurality of control devices respectively assigned to perform a corresponding plurality of control functions. The transmitter has an oscillator to generate a timing pulse signal. A diode logic system is responsive to the timing pulses to develop a plurality of digital signals, each signal consisting of a predetermined combination code group of the timing pulses and corresponding to one of the control functions. A manual switch is used to select a particular code group corresponding to the function the operator desires to control. A carrier-wave oscillator is frequency modulated by the selected code signal and the composite signal is transmitted to the receiver wherein the selected code signal is recovered. A diode logic system in the receiver deciphers the recovered code group and generates an appropriate actuating signal for application to the control device corresponding to the desired control function. To enhance the system's immunity to extraneous signals, an inhibiting circuit is provided comprising a timing signal generator in the receiver responsive to the received modulated carrier wave signal to reconstruct therefrom the timing signal generated in the transmitter. The reconstructed timing pulses are simultaneously applied to a detector and gating circuit to permit application of the actuating signal to the control device. In the absence of a received carrier wave signal modulated by a code signal, no timing signal pulses are reconstructed and the inhibiting circuit does not permit application of an actuating signal to a control device.

Inventor
Melvin C. Hendrickson
By [signature]
Attorney

Inventor
Melvin C. Hendrickson
By [signature]
Attorney

MULTIPLE-FUNCTION REMOTE CONTROL SYSTEM

BACKGROUND OF THE INVENTION

The convenience and efficiency-of-operation features of remote control systems are widely appreciated. They enable an operator to easily operate devices which are inconveniently located or even inaccessible under normal operating conditions. Remote control systems are quite obviously more attractive, safe, and efficient when there is no physical connection such as a cable between the remote unit and the device being operated. Consequently, various types of wireless remote control systems have been developed using sonic, ultrasonic, optic, electromagnetic, or other signals transmissible through space or air. With a wireless remote control system, however, the possibility of misoperation caused by extraneous signals is increased. Furthermore, as modern-day devices become more complex, it is desirable to control a greater number of different functions, resulting in an increase in the number of signals required to operate the system and thereby further increasing the possibility of misoperation.

It is therefore an object of this invention to provide a new and improved wireless multiple-function remote control system which is efficient and simple to operate.

It is a further object of the invention to provide a new and improved wireless multiple-function remote control system which is capable of precisely controlling a relatively large number of functions.

It is another object of the invention to provide a new and improved wireless multiple-function remote control system which is highly immune to extraneous signals.

SUMMARY OF THE INVENTION

A wireless multiple-function remote control system having a transmitter and a receiver for selectively actuating any of a plurality of control devices respectively assigned to perform a corresponding plurality of control functions, constructed in accordance with the invention, comprises means for selectively generating any of a plurality of digital signals each associated with a different one of said control functions. Means are provided for developing a carrier wave signal modulated by the selected digital signal and transmitting the modulated carrier signal to the receiver. Means for receiving the modulated carrier signal and detecting the selected digital signal are also provided. Digital logic means responsive to the detected signal are provided for actuating its associated control device.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
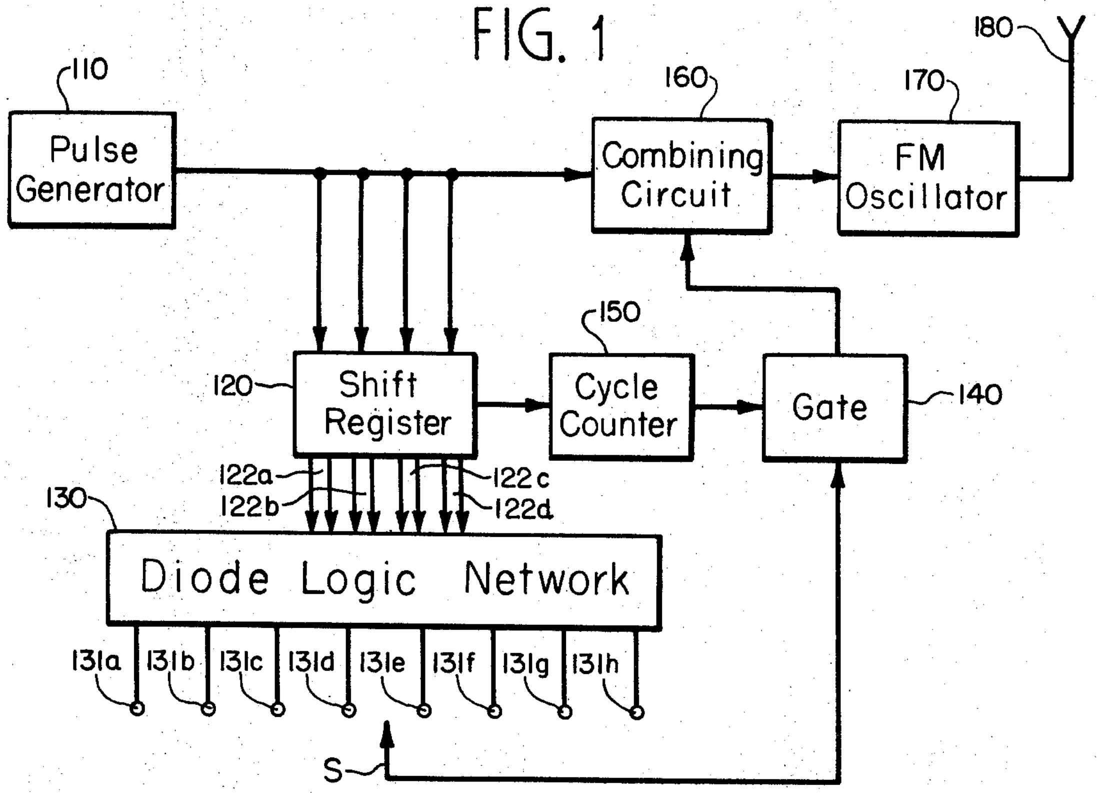
FIG. 1 is a block diagram of the transmitter portion of a preferred embodiment of the invention.
Figure 3A:
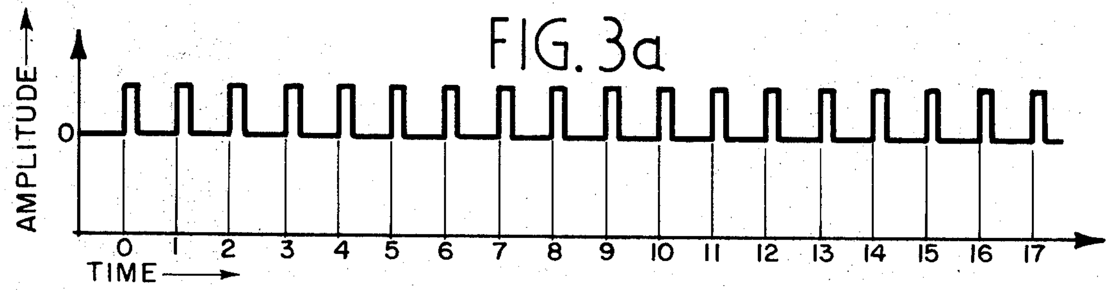
FIGS. 3*a*, 3*b*, 3*c*, and 3*d*, and 3*e* are graphical representations of the control signals employed by the preferred embodiment of the invention illustrated in FIGS. 1 and 2.

With reference to FIG. 1, a preferred embodiment of a remote control transmitter constructed in accordance with the present invention is shown in block diagram form. In general, the transmitter comprises a pulse generator 110 which is employed to develop a reference or timing signal. Any suitable generator may be used, although a 1,000 hertz multivibrator with a 25 percent duty cycle is preferable for this embodiment. The waveform of the timing signal thus generated is a series of pulses as illustrated in FIG. 3*a*. The period of each pulse cycle, designated 1, 2, 3, 4, etc. is 2 millisecond.

Figure 3B:
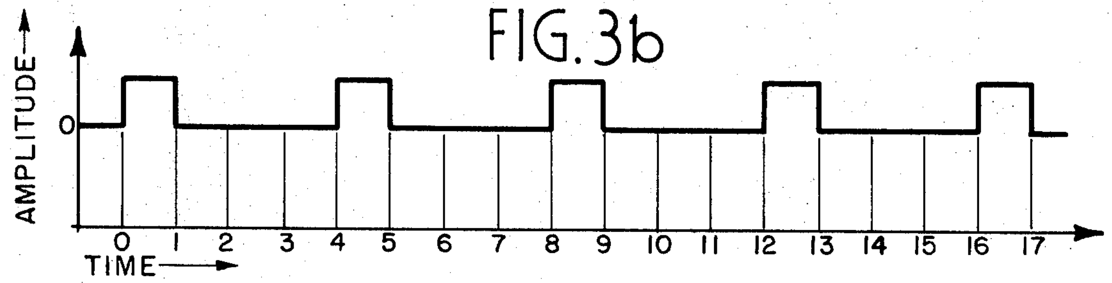

A shift register 120 is responsive to the timing pulses to produce different output pulse signals at its respective output circuits **122*a*, 122*b*, 122*c*, and 122*d*. Each output circuit consists of a pair of leads corresponding to the "high" and "low" outputs of the shift register. In this embodiment a four-stage shift register is employed. Consequently, one output pulse (with two components, one "high" and one "low") is produced at output circuit 122*a*, for example, for every four timing pulses applied to the shift register 120, four timing pulses constituting one counting cycle. The waveform for the "-high" component pulses at output circuit 122*a*** is illustrated in FIG. 3*b*. A similar output pulse signal is produced sequentially at each of the other output circuits **122*b*, 122*c*, and 122*d***, each such output signal being delayed one timing signal period from the signal at the previous output circuit in the sequence.

A diode logic network 130 is coupled to shift register 120 to produce eight digital signals at its output terminals designated **131*a* to 131*h*. Each digital signal comprises a predetermined code group of output pulses corresponding to a different control function. That is, the code groups consist of binary combinations of the output pulses produced at the shift register output circuits. These code groups, for example, may comprise various combinations of the presence and absence of one or more pulses in a group of four pulses at a particular time, the presence of a pulse representing a binary digit 1 and the absence of a pulse representing a binary digit 0. Consequently, with the four-stage shift register shown in FIG. 1, 16 possible combinations may be produced, yielding 16 distinct binary numbers or code groups. Each code group may correspond to one of the control functions desired to be operated, however in this embodiment, only eight of the 16 possible groups are utilized. The eight groups may, for example, be associated with the eight functions of a color television set that have been found most desirable to be remotely controlled, that is, channel selection, volume level, color level, and hue —all four in both directions. If more functions are desired, it is a simple design procedure to modify the diode logic network 130 to produce as many of the remaining eight code groups as desired. Of course if more than 16 functions are desired, one may use a five-stage shift register for a total of up to 32 functions; a six-stage shift register, 64** functions, etc. Any number of combination code groups is possible, consequently, any number of control functions may be controlled by this system.

A switch S, which may be manually operated by the user, is used to select the particular output terminal where the code group corresponding to the desired control function is developed and couple that signal to a gate 140. An electronic or cycle counter 150 develops a reference signal indicative of the duration of the counting cycle of the shift register 120, as illustrated in FIG. 3*c*, and applies it to the gate 140. It thereby alternately opens and closes the gate 140 to permit the selected code group to be coupled to a combining circuit 160 only during alternate shift register counting cycles. Circuit 160 combines the selected code group with the timing signal from pulse generator 110 to produce a control or modulating signal therefrom which is applied to the frequency-modulated carrier wave oscillator 170. Any suitable oscillator may be employed, however, a carrier frequency of 40,000 hertz is preferable. The frequency-modulated carrier wave signal thus developed is transmitted by means of transducer 180 to the remote control receiver shown in FIG. 2.

Figure 2:
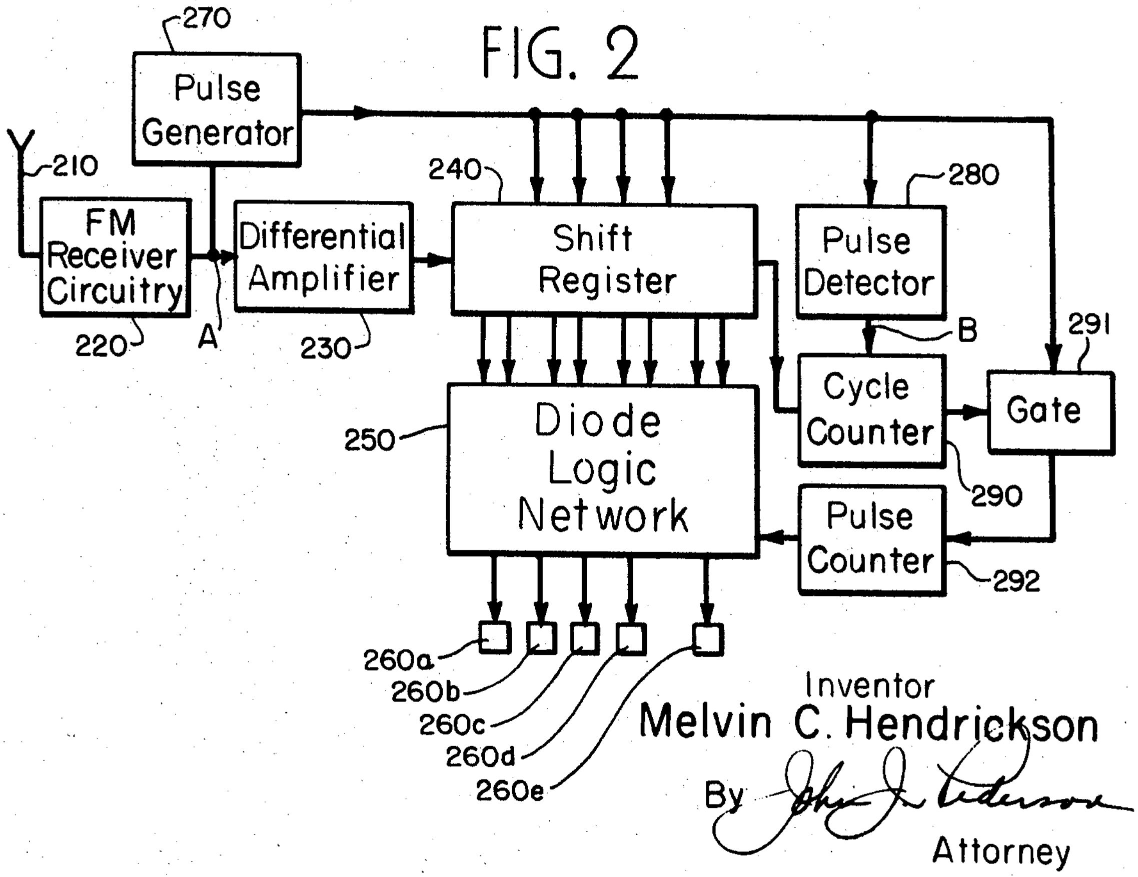
FIG. 2 is a block diagram of the receiver portion of a preferred embodiment of the invention.
Figure 3C:
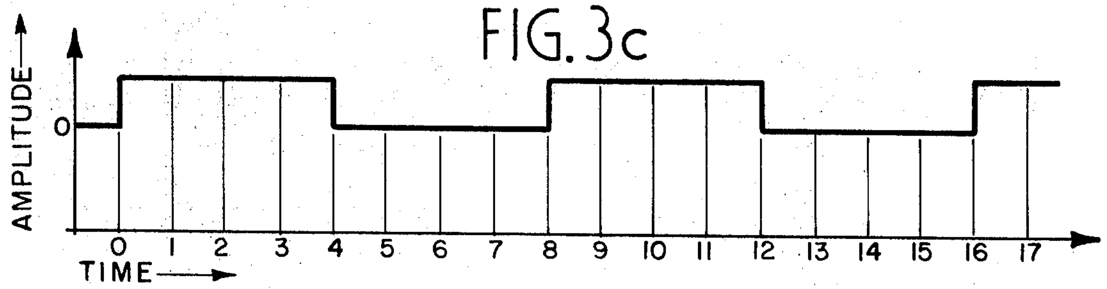

Turning now to FIG. 2, a preferred embodiment of a remote control receiver constructed in accordance with the invention is shown in block diagram form. A transducer 210 receives the transmitted frequency-modulated carrier wave signal and converts it into an electrical signal which is applied to FM receiver circuitry 220 wherein the control signal is recovered. Although not necessary for the operation of the invention, the FM receiver circuitry 220 may consist of a limiter for converting the received signal into an amplitude-limited electrical signal and a frequency discriminator for distinguishing the signal from extraneous signals.

A pulse generator 270 is coupled to the output of the FM receiver circuitry 220 at terminal A and is responsive to the control signal for reconstructing the timing signal generated in the transmitter. A differential amplifier 230 is also coupled to the output of the FM receiver circuitry 220 at terminal A and is responsive to the recovered control signal for developing a logic signal therefrom. A four-stage shift register 240, similar to that of the transmitter, is coupled to generator 270 and amplifier 230 and is conjointly responsive to the reconstructed timing pulses and the logic signal, for temporarily storing a digital signal representative of the code group selected in the transmitter. The stored digital signal is deciphered by the diode logic network 250 and an appropriate actuating signal is generated therein for subsequent application to the control device, selected from the group of control devices 260*a*, 260*b*, 260*c*, 260*d*, and 260*e*, which corresponds to the desired control function.

In the embodiment illustrated in FIG. 2, five functions are illustrated and designated 260*a*through 260*e*. The adaptation of the invention to any desired number of control functions is implicit inasmuch as the total number of controlled functions is limited only by the number of distinct code groups generated in the transmitter, one function per code group. Just as the number of possible code groups in the transmitter may be varied by conventional design procedures, so may the receiver structure be modified to correspond to the particular number of code groups (and therefore control functions) employed by the transmitter. Furthermore, various numbers and combinations of control devices may be utilized to perform the desired functions. For example, control devices 260*a*, 260*b*, 260*c*, and 260*d* may be used to perform four control functions (channel selection, volume control, color level, and hue for a color television receiver). Control device 260*e*, however, may be assigned to control the direction in which control devices 260*a*, 260*b*, 260*c*, and 260*d*, are operated (up-down, increase-decrease, etc). Thus, five control devices may perform eight control functions.

The system as thus far described, because of the coded nature of the control signal, is relatively immune to misoperation caused by extraneous signals. Where desired, however, an additional safeguard against unwanted operation of a control device caused by extraneous signals may be employed. Such a safeguard, in accordance with another feature of the invention, is shown in FIG. 2 in the form of an inhibiting circuit which comprises a pulse detector 280, an electronic or cycle counter 290, an electronic gating circuit 291, and a pulse counter 292. The pulse detector 280, only in response to the reconstructed timing signal, develops a control effect, which may be merely the presence of absence of a predetermined DC voltage, at terminal B. Cycle counter 290 is quite similar to that of the transmitter insofar as it develops a reference signal indicative of the duration of the counting cycle of shift register 240. Each time a digital signal is temporarily stored in the shift register, a counting cycle is thereby completed and such is indicated by cycle counter 290. Gate 291, consequently, in response to the reference signal, is alternately closed and opened to permit passage of the reconstructed timing pulses from the pulse generator 270 to the pulse counter 292 only during alternate shift register counting cycles. By making cycle counter 290 conjointly responsive to the control effect and the digital signal, gate 291 may only be opened when a detected control signal is presented at terminal A. When such is the case, the gate passes the reconstructed timing pulses to pulse counter 292 wherein a predetermined number of pulses are counted. Upon the counting of the correct number of pulses, a triggering signal is developed and applied to the diode logic network 250 to enable application of the actuating signal to the appropriate control device. Thus, unless a proper control signal is present at terminal A, any pulses generated by pulse generator 270 are precluded from reaching pulse counter 292, thereby preventing application of any actuating signal generated by the diode logic network. Consequently, the inhibiting circuit provides an effective additional safeguard against unwanted operation of the remote control system resulting from the transducer 210 inadvertently receiving extraneous signals.

In operation, and referring again to FIG. 1, switch S is moved to the desired position corresponding to the function to be controlled. Although not shown in this embodiment, conventional design techniques may be used to make switch S simultaneously apply power from a battery, for example, to the transmitter. Energizing the pulse generator 110 initiates the generation of a series of timing pulses. The first four pulses actuate the four-stage shift register 120 through one counting cycle whereupon counter 150 developes a reference signal indicative thereof which opens gate 140 and thereby completes the electrical path from switch S to combining circuit 160. Hence, any signal developed by diode logic network 130 during this first cycle is precluded from reaching the combining circuit 160 by the closed gate 140.

The next four pulses from pulse generator 110 operate shift register 120 through a second counting cycle. During this second counting cycle diode logic network 130 develops a plurality of digital signals consisting of predetermined binary combinations or code groups of output pulses, each group corresponding to one of the control functions. The code groups selected by switch S is coupled through the now-open gate 140 to the combining circuit 160. Counter 150 senses the completion of this second counting cycle and closes gate 140. Consequently, this eight-pulse cycle is repeated for as long as the operator maintains the switch S in an operating position.

Figure 3D:
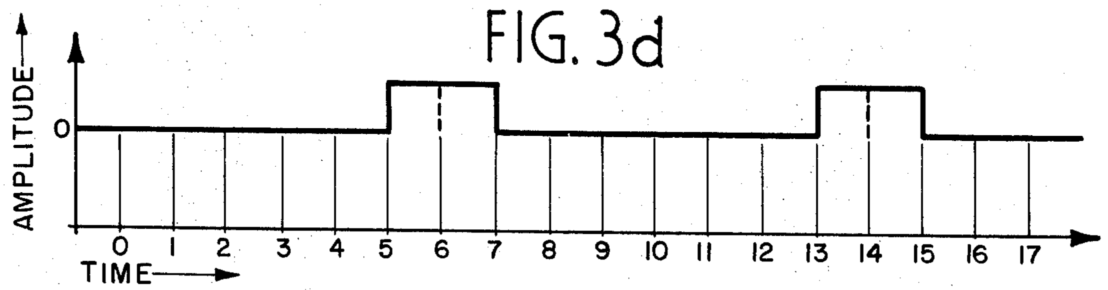
Figure 3E:
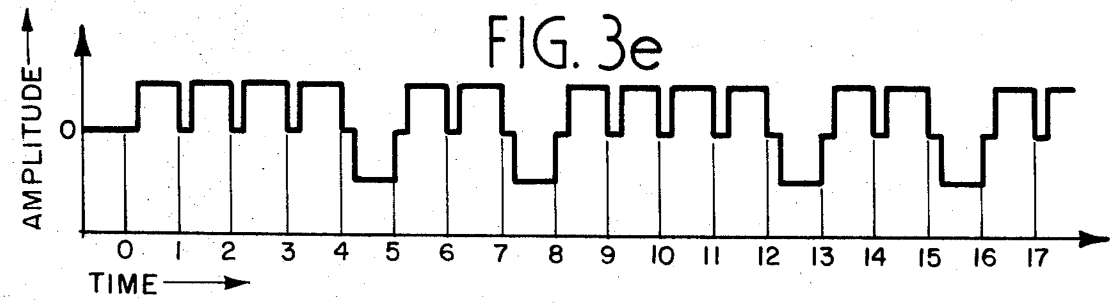

For the purpose of illustration, suppose the operator desires to control the function associated with the binary code group 0110. The code signal he would select with switch S for this example is illustrated in FIG. 3*d*. For time periods 1 through 4, the gate is closed so there is no signal. Starting with time period 5, there is an absence of a pulse which corresponds to the binary digit 0. During time periods 6 and 7 there is a pulse indicating the binary digit 1 for each period. The dotted line is used in FIG. 3*d* to show that there are actually two pulses because, without it, two adjacent pulses appear as one long pulse. Finally, at time period 8, there again is an absence of a pulse indicating another binary digit 0. The combining circuit 160 combines the timing signal from pulse generator 110 with this selected code group (0110) to form a control signal which is applied to the frequency modulated oscillator 170. As a result, the control signal comprises an eight-time-period (or eight-bit) signal representing four timing pulses followed by a four-digit code group as illustrated in FIG. 3*e*. The pulses or bits of the control signal are preferably spaced as shown and negative pulses are used to represent 0 binary code digits, also as shown, in order to expedite recovery of the control signal by the receiver. The eight-bit signal is repeatedly generated for as long as the transmitter is operated, to thereby constitute the desired control signal. From this control signal, oscillator 170 develops a frequency-modulated carrier wave signal which is applied to the transducer 180 for transmission to the receiver shown in FIG. 2.

Again referring to FIG. 2, receiver operation is initiated by the reception of the transmitted carrier wave signal by transducer 210. The received carrier signal is converted into an electrical signal which is applied to FM receiver circuitry 220 wherein the control signal, as illustrated in FIG 3*e*, is recovered. The recovered control signal is coupled to the differential amplifier 230 wherein a logic signal corresponding to the transmitted control signal is developed and applied to shift register 240. The control signal is simultaneously coupled to the pulse generator 270 wherein a series of timing pulses similar to that of the transmitter are reconstructed.

The first four pulses reconstructed by the pulse generator 270 operate the four-stage shift register 240 through one counting cycle. During this first counting cycle, shift register 240 is also responsive to the recovered control signal to temporarily store a digital signal representative of the first four bits of the eight-bit control signal. The duration of this counting cycle is indicated by cycle counter 290 from which a reference signal is developed for application to gate 291. Cycle counter 290 is conjointly responsive to the shift register counting cycle and the control effect from pulse detector 280 so that the application of the reference signal to the gate 291 is dependent upon the correct timing pulses being reconstructed by pulse generator 270. Upon completion of this first counting cycle, gate 291 is opened and pulse counter 292 is thereby coupled to pulse generator 270.

The next four reconstructed timing pulses (pulses 5 through 8) and the logic signal developed from the second four-bit group of the eight-bit control signal conjointly operate shift register 240 through a second counting cycle. A second digital signal is thereby temporarily stored in shift register 240 and deciphered by diode logic network 250; an appropriate actuating signal is generated therefrom for application to the control device corresponding to the desired control function. Simultaneously with the completion of the second counting cycle of shift register 240, pulse counter 292 counts the fourth pulse from pulse generator 270 (actually the eighth pulse because the first four pulses were blocked by the closed gate 291) and accordingly applies a triggering signal to a diode logic network 250 to thereby enable application of the actuating signal to the appropriate control device. Cycle counter developes a reference signal indicating the completion of this second counting cycle and thereby closes gate 291. The operation is repeated for as long as the control signal is generated and transmitted to the receiver. In this manner, the desired function may be performed for as long as it is necessary to achieve the desired result.

Thus the invention provides a new and improved remote control system which may easily be adapted to a large number of control functions. The design freedom, with regard to the total number of control functions the system is capable of remotely controlling, is practically unlimited. MOreover, the noise immunity of the disclosed invention is essentially perfect inasmuch as only a signal from which a predetermined coded digital signal may be derived will operate a control device to perform a control function. The probability of the receiver receiving an extraneous signal having these characteristics is exceedingly remote.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A wireless multiple-function remote control system utilizing an FM transmitter and receiver for selectively actuating any desired one of a plurality of control devices respectively assigned to perform a corresponding plurality of control functions, comprising:

an oscillator for generating a series of timing pulses with a predetermined repetition rate;

a shift register, coupled to said pulse-generating means, having a plurality of output circuits, and responsive to said timing pulses for producing different output pulse signals at said respective output circuits;

a first diode logic network coupled to said output circuits for producing digital signals consisting of predetermined combination code groups of said output pulses, each said group corresponding to one of said control functions;

switch means coupled to said first diode logic network for selecting any desired one of said code groups;

means for combining said timing pulses with said selected code group to produce a control signal therefrom;

an electronic counter coupled to said shift register for developing a reference signal indicative of the duration of the counting cycle of said shift register;

a gating circuit coupled to said counter and responsive to said reference signal for coupling said selected code group to said combining means;

a frequency-modulated carrier wave oscillator responsive to said control signal for developing and transmitting to said receiver a carrier wave signal frequency modulated by said control signal;

input circuit means including a transducer for receiving said frequency-modulated carrier wave signal and recovering said control signal therefrom;

means coupled to said input circuit means and responsive to said control signal for reconstructing said series of timing pulses;

a differential amplifier coupled to said input circuit and responsive to said control signal for developing a logic signal;

a second shift register conjointly responsive to said reconstructed timing pulses and said logic signal for temporarily storing a digital signal representative of said selected code group;

a second diode logic network coupled to said shift register for deciphering said stored digital signal and generating an appropriate actuating signal for application to the control device corresponding to the desired control function;

means coupled to said reconstructing means and responsive to said reconstructed timing pulses for developing a control effect indicative of the presence of a control signal;

a second electronic counter, coupled to said second shift register, conjointly responsive to said control effect and said stored digital signal for developing a second reference signal indicative of the duration of the counting cycle of said second shift register;

pulse counter means responsive to said reconstructed timing pulses for developing a triggering signal upon counting a predetermined number of timing pulses to enable application of said actuating signal to said control device; and an electronic gating circuit coupled to said reconstructing means and responsive to said second reference signal for coupling said reconstructed timing pulses to said pulse counter means.